US 8,423,994 B2

(12) United States Patent
Sheehan et al.

(10) Patent No.: US 8,423,994 B2
(45) Date of Patent: Apr. 16, 2013

(54) RECIPE BASED APPLICATION CONVERSION

(75) Inventors: John M. Sheehan, Cambridge, MA (US); Carolyn L. Napier, Redmond, WA (US); Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 12/465,793

(22) Filed: May 14, 2009

(65) Prior Publication Data

US 2010/0293540 A1 Nov. 18, 2010

(51) Int. Cl.
G06F 9/445 (2006.01)

(52) U.S. Cl.
USPC ............................................ 717/174

(58) Field of Classification Search .................. None
See application file for complete search history.

(56) References Cited

U.S. PATENT DOCUMENTS

| | | | | |
|---|---|---|---|---|
| 5,684,996 | A * | 11/1997 | Westerholm et al. | 717/168 |
| 6,507,675 | B1 | 1/2003 | Lee et al. | |
| 6,615,405 | B1 * | 9/2003 | Goldman et al. | 717/174 |
| 6,834,370 | B1 | 12/2004 | Brandl et al. | |
| 7,207,017 | B1 | 4/2007 | Tabery et al. | |
| 2005/0022175 | A1 | 1/2005 | Sliger et al. | |
| 2008/0243892 | A1 | 10/2008 | Little et al. | |

OTHER PUBLICATIONS

"New Software for Variable-data Imaging", Retrieved at <<http://findarticles.com/p/articles/mi_qa4088/is_200405/ai_n9433839>>, May 2004, pp. 1-2.

"Converting Newer 1.0 Views to 2.0 Format", Retrieved at <<https://archibus.uncc.edu/archibus/schema/ab-system/help/archibus_fm_help/Subsystems/webc/Content/fim/Managing_WC/view_def/view_converter.htm>>, Mar. 19, 2009, pp. 1-3.

Torralba, et al., "Properties and Applications of Shape Recipes", Technical Report AIM-2002-019, MIT AI lab, Retrieved at <<ftp://publications.ai.mit.edu/ai-publications/2002/AIM-2002-019.pdf, Dec. 2002, pp. 1-10.

"Converting RecipeBook XML to Other Formats", Retrieved at <<http://www.happy-monkey.net/recipebook/doc/xsl-converter.html>>, Mar. 19, 2007, pp. 1-3.

"The AppDeploy Repackager v1.1", KACE Networks, Inc.,(Apr. 9, 2009), 1 page.

"Binary Delta Compression", (Mar. 2004), 10 pages.

Potter, Susan "Using Binary Delta Compression (BDC) Technology to Update Windows XP and Windows Server 2003", Windows Server 2003, Microsoft Corporation, (Jun. 2005), 15 pages.

* cited by examiner

*Primary Examiner* — Chun-Kuan Lee
*Assistant Examiner* — Ronald Modo
(74) *Attorney, Agent, or Firm* — Wolfe-SBMC

(57) ABSTRACT

An installation package associated with an application is obtained. Installation of the application in a first type of system is analyzed based at least in part on the installation package. A first set of changes made to the first type of system resulting from installation of the application in the first type of system is identified. Based on the first set of changes, a second set of changes made to a second type of system resulting from installation of the application in the second type of system is identified, and a recipe identifying the second set of changes is generated. A new installation package associated with the application can also be generated. This new installation package is configured for installation of the application on the second type of system, and is based at least in part on both the recipe and the installation package.

20 Claims, 6 Drawing Sheets

RECIPE BASED APPLICATION CONVERSION

BACKGROUND

As computing technology advances, the manner in which systems operate changes over time. While these changes typically provide numerous benefits and advantages, migrating to these changed systems can be problematic. For example, applications can be designed to be installed on an older system, and an installation package with various files and data can be generated to allow the application to be installed on the older system. However, newer systems operating using different techniques can require applications to be installed in different manners, so situations can arise where the installation package for installing the application on the older system cannot be used to correctly install the application on the newer system. This can result in users having applications that cannot be installed on their new systems, leading to user frustration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an installation package associated with an application is obtained. Installation of the application in a first type of system is analyzed based at least in part on the installation package. A first set of changes made to the first type of system resulting from installation of the application in the first type of system is identified. A second set of changes made to a second type of system resulting from installation of the application in the second type of system is identified, and a recipe identifying the second set of changes is generated. This second set of changes made to the second type of system is identified based on the first set of changes made to the first type of system.

In accordance with one or more aspects, in a first type of system an installation package associated with an application is obtained, with the installation package being configured for installation of the application on a second type of system. A recipe corresponding to the application is also obtained, with the recipe identifying a first set of one or more changes to be made to the first type of system when installing the application on the first type of system. This first set of one or more changes is based on a second set of one or more changes made to the second type of system resulting from installing the application on the second type of system. A new installation package associated with the application is also generated. This new installation package is configured for installation of the application on the first type of system, and is based at least in part on both the recipe and the installation package.

BRIEF DESCRIPTION OF THE DRAWINGS

The same numbers are used throughout the drawings to reference like features.

DETAILED DESCRIPTION

Recipe-based application conversion is discussed herein, allowing an application to be converted for installation on one type of system to installation on another type of system using a recipe. A first installation package configured to install an application in one type of system is analyzed and a set of changes made to that type of system resulting from installation of the application on that type of system is identified. A second set of changes is also generated and stored as a recipe associated with the application. This second set of changes identifies changes that are made to a second type of system when installing the application on the second type of system. This second set of changes is generated based on the set of changes made to the one type of system resulting from installation of the application on that one type of system, as well as differences between the two types of systems. This recipe can be used, in conjunction with the first installation package, to generate a second installation package that can be used to install the application on the second type of system without requiring any changes to the first installation package.

Figure 1:
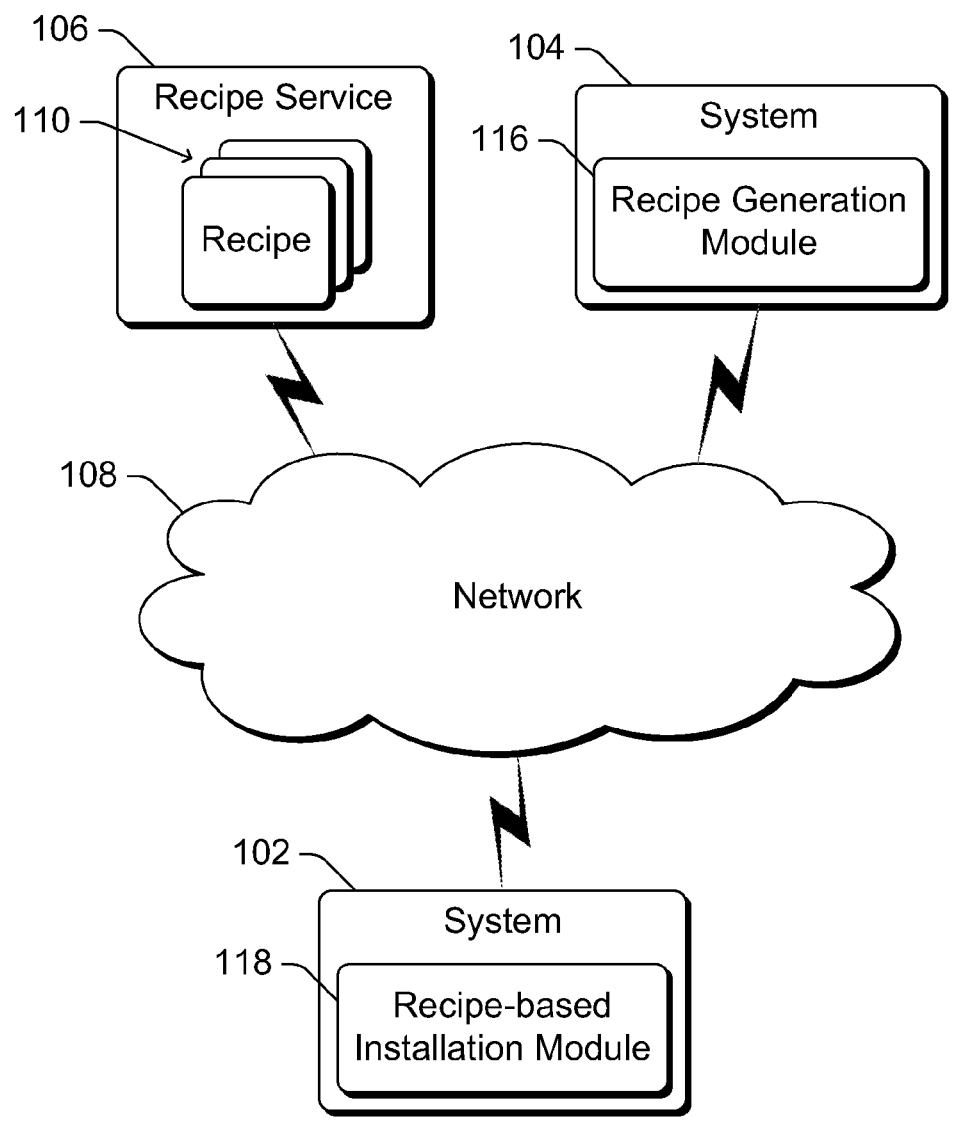
FIG. 1 illustrates an example system implementing the recipe-based application conversion in accordance with one or more embodiments.

FIG. 1 illustrates an example system 100 implementing the recipe-based application conversion in accordance with one or more embodiments. System 100 includes a system 102, a system 104, and a recipe service 106 that can communicate with one another via a network 108. Network 108 can be a variety of different networks, including the Internet, a local area network (LAN), a public telephone network, a cellular or other wireless phone network, an intranet, other public and/or proprietary networks, combinations thereof, and so forth.

System 102 can be implemented using a variety of different computing devices capable of running applications. For example, system 102 can be implemented in a desktop computer, a mobile station, an entertainment appliance, a set-top box communicatively coupled to a display device, a cellular or other wireless phone, a game console, an automotive computer, and so forth. Thus, system 102 can be implemented in devices ranging from a full resource device with substantial memory and processor resources (e.g., personal computers, game consoles) to a low-resource device with limited memory and/or processing resources (e.g., traditional set-top boxes, hand-held game consoles). System 102 is typically implemented on a single computing device, but can alternatively be implemented across multiple computing devices.

System 104 can, analogous to system 102, be implemented using a variety of different computing devices, ranging from a full resource device with substantial memory and processor resources to a low-resource device with limited memory and/or processing resources. System 104 is typically implemented on a single computing device, but can alternatively be implemented across multiple computing devices.

Different types of systems are implemented using different software, typically different operating systems or versions of operating systems. There can also be various differences in hardware and/or firmware on which the different types of systems are implemented. The manner in which different types of systems operate can vary. For example, different types of systems can implement operating system registration stores in different manners, different types of systems can have different rules regarding how operating system registration stores are accessed, different types of systems can have different rules regarding which folders or directories files can be stored in, and so forth.

Recipe service 106 is a service that maintains one or more recipes 110. Each of these recipes 110 can be used, in conjunction with an installation package configured to install an application on a particular type of system, to install that application on another system. Recipes 110 and their use are discussed in more detail below. Recipe service 106 can, analogous to system 102, be implemented using a variety of different computing devices, ranging from a full resource device with substantial memory and processor resources to a low-resource device with limited memory and/or processing resources. Recipe service 106 can be implemented on a single computing device or can alternatively be implemented across multiple computing devices.

System 104 includes a recipe generation module 116 that generates a recipe associated with an application. System 104 communicates the generated recipe to recipe service 106, which stores the received recipe as a recipe 110. Recipe service 106 maintains a correspondence of recipes 110 to applications, allowing the particular recipe corresponding to a particular application to be subsequently identified.

System 102 includes a recipe-based installation module 118. When installing an application from an installation package that has not been configured for system 102, installation module 118 obtains the recipe 110 corresponding to that application from recipe service 106. Installation module 118 can then use the obtained recipe, along with the installation package, to install the application on system 102.

Figure 2:
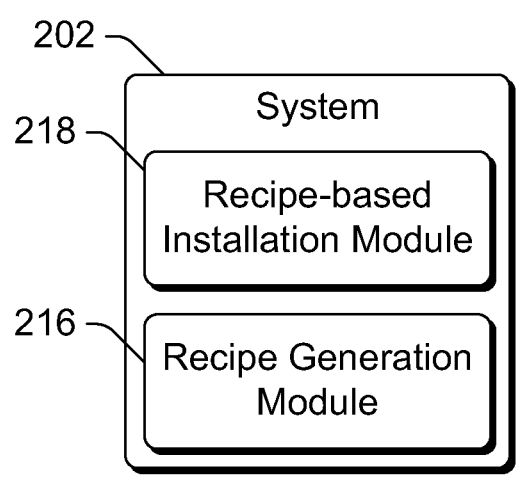
FIG. 2 illustrates another example system implementing the recipe-based application conversion in accordance with one or more embodiments.

In system 100, a recipe is generated on one type of system (system 104) and used for installation of an application on another type of system (system 102). FIG. 2 illustrates another example system 202 implementing the recipe-based application conversion in accordance with one or more embodiments. System 202 can be implemented using a variety of different computing devices, analogous to system 102 of FIG. 1. System 202 includes a recipe generation module 216 that generates recipes analogous to recipe generation module 116 of FIG. 1. System 202 also includes a recipe-based installation module 218 that installs an application using a recipe analogous to recipe-based installation module 118 of FIG. 1. Accordingly, system 202 can generate the recipe for an application and install the application using that recipe (in conjunction with the installation package for the application). As system 202 generates the recipe, no recipe service 106 of FIG. 1 need be accessed by system 202 to obtain the recipe.

It is also to be appreciated that system 202 can be used in system 100 of FIG. 1. For example, recipe-based installation module 218 of system 202 can access recipe service 106 to obtain a recipe for an application, and if no such recipe is available from recipe service 106 then recipe generation module 216 can generate the recipe.

Figure 3:
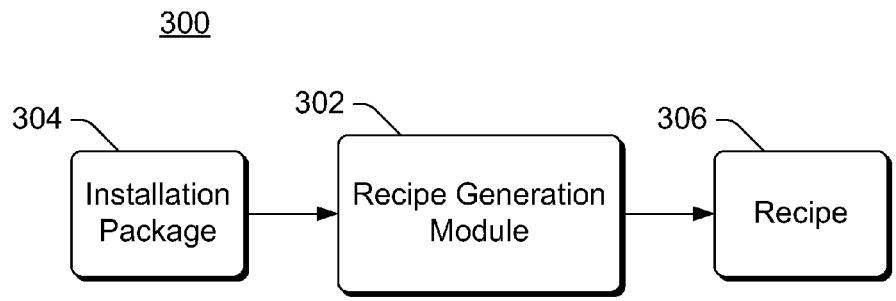
FIG. 3 is a block diagram illustrating an example system that generates a recipe in accordance with one or more embodiments.

FIG. 3 is a block diagram illustrating an example system 300 that generates a recipe in accordance with one or more embodiments. System 300 includes a recipe generation module 302, which can be, for example, a recipe generation module 116 of FIG. 1 or a recipe generation module 216 of FIG. 2. Recipe generation module 302 obtains an installation package 304 configured to install an associated application on a first type of system, and generates a recipe 306 that can be used in conjunction with installation package 304 to install the associated application on a second system of a different type.

Recipe 306 is associated with the application that can be installed using installation package 304. This association allows recipe 306 to be saved and subsequently used by different computing devices. Recipe 306 can be saved, for example, in recipe service 106 of FIG. 1. Alternatively, if recipe 306 is being generated and used by the same computing device (e.g., the device implementing system 202 of FIG. 2), then no such association between installation package 304 and recipe 306 need be maintained.

Recipe 306 can be associated with the application that can be installed using installation package 304 in a variety of different manners. In one or more embodiments, a representation of installation package 304 is generated that allows installation package 304 to be distinguished from other installation packages. This representation is also referred to as an application id (identifier) and can be, for example, a hash value generated by applying a hash algorithm to installation package 304 or a portion thereof (e.g., one or more files included in installation package 304). Any of a variety of different well-known hash algorithms can be used to generate this hash value. This hash value can then be stored in recipe 306, or alternatively a list or other record of the correspondence between the hash value and the recipe 306 can be maintained.

Alternatively, recipe 306 can be associated with the application that can be installed using installation package 304 in other manners. For example, an application identifier can be assigned by a developer or other party and included in installation package 304 as well as in the associated recipe 306. By way of another example, various information regarding installation package 304 (such as the name of the file storing installation package 304, the size (e.g., in bytes) of installation package 304, a creation date and/or time of installation package 304, and so forth) can be combined to generate an application id. This combining can be, for example, concatenating the information into a single string of characters. This application id can be stored in recipe 306, or alternatively a list or other record of the correspondence between the application id and the associated recipe 306 can be maintained.

Installation package 304 includes the data for installing an application on a system. This data includes various instructions, data, and optionally other information describing the application. This data is typically grouped together in one or more files, including application files as well as configuration files. Application files include instructions, data, and/or other information that are to be stored in a particular folder or directory of the system. Configuration files include data and/or other information that is to be stored in a particular folder or directory of the system, and/or stored in a registration store of the system.

The instructions, data, and/or other information in installation package 304 can optionally be compressed or combined together into a single installation package file. Any of a variety of well-known compression techniques can be used to generate the single installation package file. For example, installation package 304 can be a Microsoft Windows® operating system Installer package file (additional information regarding such package files is available from Microsoft Corp. of Redmond, Wash.), a CAB (cabinet) file, a ZIP file, and so forth.

Different types of systems can operate in different manners. These different manners of operation can take a variety of different forms, such as locations where files are to be stored, naming conventions for files, types of data that is to be stored in an operating system registry, a manner in which an operating system registry is to be accessed, and so forth. For example, one type of system may allow application files to be stored in a particular folder or directory during installation, while another type of system may prohibit application files from being stored in that particular folder or directory during installation.

By way of another example, two different types of systems may both have an operating system registration store in which various data regarding the installation and/or configuration of an application is stored. However, each of these two types of systems can differ in how the application accesses this registration store. E.g., one type of system may permit direct access to the registration store, while another type of system employs an application programming interface (API) exposing one or more methods that are invoked to access the registration store.

Installation package 304 is associated with a particular application, and is configured to install the associated application on a system of a particular type. The developer or designer of installation package 304 is aware of the manner in which systems of that particular type operate and configures package 304 in accordance with that manner of operation. For example, installation package 304 can be configured to indicate that application files are to be stored in a particular directory or directories, that particular values are to be stored in the operating system registration store, and so forth.

For the particular type of system for which installation package 304 is configured to install the associated application, recipe generation module 302 analyzes installation of the application on that particular type of system. As at least part of the analysis, recipe generation module 302 determines the changes resulting from installation of the application on that particular type of system. These changes can include, for example, files written into particular folders or directories, settings or values written into an operating system registration store, and so forth.

This analysis can be performed by recipe generation module 302 in a variety of different manners. Different example manners in which this analysis can be performed by module 302 are discussed below, although it is to be appreciated that the analysis can alternatively be performed in other manners.

In one or more embodiments, the analysis is performed by recipe generation module 302 monitoring the installation of the application on system 300. An installer module (not shown) of system 300 accesses installation package 304 and installs on system 300 the application associated with installation package 304. A sequencer module, which can be included in recipe generation module 302, monitors the changes made to system 300 during the installation process. Alternatively, the sequencer module can be separate from module 302 and can communicate to module 302 the changes it identifies in system 300.

In other embodiments, installation package 304 is implemented in a declarative manner in which the actions to be taken to install the application associated with installation package 304 are listed as part of package 304. In such embodiments, recipe generation module 302 can access the actions listed in package 304 and readily ascertain, from those listed actions, the changes resulting from installation of the application on a particular system (system 300 or alternatively another system). For example, installation package 304 can include a list of files from package 304 that are to be stored in the system as well as the folders where those files are to be stored, installation package 304 can include a list of configuration values that are to be stored in an operating system registry, and so forth.

In other embodiments, recipe generation module 302 records a pre-installation state of system 300 prior to the application associated with installation package 304 being installed. An installer module (not shown) of system 300 then accesses installation package 304 and installs on system 300 the application, then recipe generation module 302 records a post-installation state of system 300. These two states (pre-installation and post-installation) are then compared to determine the differences, and thus the changes that were made to system 300. These states include, for example, indications of which files are stored in which directories or folders, what values are stored in an operating system registry, and so forth.

In addition, recipe generation module 302 is aware of the differences between the type of system for which installation package 304 is configured and the type of system for which recipe 306 is being generated. Recipe generation module 302 can be made aware of these differences in a variety of different manners. For example, module 302 can be pre-configured with these differences, module 302 can obtain these differences from a remote source (e.g., a service accessed via network 108 of FIG. 1), module 302 can obtain these differences from a local source (e.g., a file stored in system 300, a removable storage device coupled to system 300, etc.), and so forth.

Based on the analysis performed by recipe generation module 302, module 302 can identify the changes made to the type of system on which the application is to be installed resulting from installation of the application on that particular type of system. As recipe generation module 302 is also aware of the differences between the type of system for which installation package 304 is configured and the type of system for which recipe 306 is being generated, recipe generation module 302 can readily identify the changes to be made to the type of system for which recipe 306 is being generated based on the changes made to the type of system for which installation package 304 is configured.

For example, assume that installation package 304 is configured to install an application on a first type of system, and that a recipe 306 allowing installation package 304 to be used to install that application on a second type of system is desired. Further assume that as a result of installing the application associated with installation package 304 on the first type of system, a particular file named "foo.txt" is stored in a particular directory "c:\system". As part of the differences between the first and second types of systems that module 302 is aware of, further assume that module 302 is aware that the second type of system does not permit the installation process to store files in the directory "c:\system", but that they are to be stored in "c:\safe\system" instead. Accordingly, module 302 can include in recipe 306 an indication that "foo.txt" is to be stored in "c:\safe\system" rather than "c:\system".

Following this same example, further assume that as a result of installing the application associated with installation package 304 on the first type of system, a particular value of "threshold_setting=5" is written in the operating system registry by the installation process. As part of the differences between the first and second types of systems that module 302 is aware of, further assume that module 302 is aware that the second type of system does not permit the installation process to directly write values to a registration store of the operating system. Rather, the installation process is to invoke a "StoreValue" method of an API and pass the "StoreValue" method a parameter that is the particular value to be stored in the registration store. Accordingly, module 302 can include in recipe 306 an indication that, rather than saving the value of "threshold_setting=5" in the registry, the "StoreValue" method is to be invoked with a parameter of "threshold_setting=5". Alternatively, rather than invoking a method of an API, in the second system a registration declaration (e.g., using an eXtensible Markup Language (XML) or other format) can be used that includes an indication that a "threshold_setting=5" value is to be maintained in the registration store. In such an alternative, module 302 can include in recipe 306 an indication that, rather than saving the value of "threshold_setting=5" in the registry, a "threshold_setting=5" value is to be included in a registration declaration.

In one or more embodiments, recipe generation module 302 can also receive user input from a user of system 300 regarding the generation of recipe 306. Such input allows the user to modify or augment recipe 306 as desired by the user. For example, a user can test recipe 306 and, if any problems are identified with recipe 306, the user can input request via module 302 to modify recipe 306 to correct such problems.

It is to be appreciated that the system in which recipe generation module 302 is implemented need not be the same type of system for which installation package 304 is configured to install the associated application. Rather, as discussed above module 302 can analyze the installation of the application on a particular type of system without actually installing the application on that particular type of system.

Figure 4:
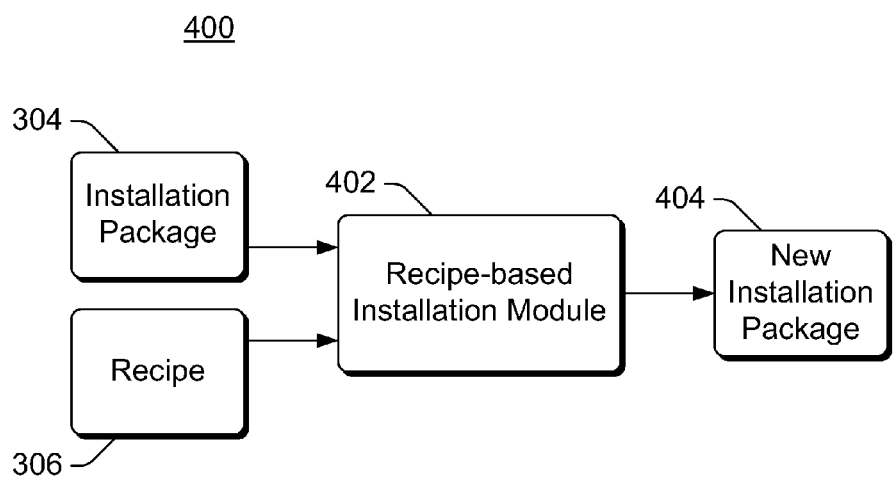
FIG. 4 is a block diagram illustrating an example system that uses a recipe in accordance with one or more embodiments.

FIG. 4 is a block diagram illustrating an example system 400 that uses a recipe in accordance with one or more embodiments. System 400 includes a recipe-based installation module 402, which can be, for example, a recipe-based installation module 118 of FIG. 1 or a recipe-based installation module 218 of FIG. 2. Recipe-based installation module 402 obtains and uses both installation package 304 and recipe 306 to generate a new installation package 404.

Installation package 304 in FIG. 4 is the same installation package 304 as was used by recipe generation module 302 in FIG. 3. Recipe 306 in FIG. 4 is the same recipe 306 as was generated by recipe generation module 302 in FIG. 3.

As discussed above, installation package 304 is configured to install an associated application on a first type of system, and recipe 306 is generated for a second type of system. To generate new installation package 404, recipe-based installation module 402 analyzes both installation package 304 and recipe 306. Changes made to the second type of system are identified based on recipe 306 and installation package 304, and those changes are reflected in new installation package 404. New installation package 404 allows the application associated with installation package 304 to be installed on the second type of system. Analogous to installation package 304, package 404 includes the data for installing an application on a particular system, although the system that the data in package 404 applies to is a different system than the system that the data in package 304 applies to. Package 404 can be provided to an application installer for the second type of system to have the application installed on the second type of system.

Continuing with the example above, assume that installation package 304 indicates that a particular file named "foo.txt" is to be stored in a particular directory "c:\system", and that recipe 306 indicates that "foo.txt" is to be stored in "c:\safe\system" rather than "c:\system". Recipe-based installation module 402 includes, in new installation package 404, an indication that "foo.txt" is to be stored in "c:\safe\system".

Continuing with this example further, assume that installation package 304 indicates that a particular value of "threshold_setting=5" is to be stored in the operating system registry, and that recipe 306 indicates that rather than writing the value of "threshold_setting=5" directly to the registry, the "Store Value" method is to be invoked with a parameter of "threshold_setting=5". Recipe-based installation module 402 includes, in new installation package 404, an indication that the "StoreValue" method is to be invoked with a parameter of "threshold_setting=5". Alternatively, assume that recipe 306 indicates that rather than writing the value of "threshold_setting=5" directly to the registry, a registration declaration is to include a value of "threshold_setting=5". In such an alternative, recipe-based installation module 402 includes, in new installation package 404, an indication that the "threshold_setting=5" value is to be included in a registration declaration.

Thus, it can be seen that recipe-based installation module 402 allows for the creation of a new installation package for the second type of system without requiring any alterations to installation package 304. The application can be converted by recipe-based installation module 402 for installation on one type of system to installation on another type of system using both recipe 306 and installation package 304.

It should be noted that the system in which recipe-based installation module 402 is implemented is typically the type of system for which recipe 306 is generated. Alternatively, the system in which recipe-based installation module 402 is implemented and in which new installation package 404 is generated can be a different type of system than the system for which recipe 306 is generated.

It should also be noted that oftentimes the recipe-based application conversion discussed herein is used with reference to only two types of systems. For example, a first type of system and a second type of system, with the second type of system being an upgraded or new version of the first type of system. The recipe-based application conversion thus allows legacy applications having an installation package created for installing the applications on devices implementing the first type of system to be readily installed on devices implementing the second type of system.

Alternatively, situations can arise where three or more types of systems are involved. In such situations, multiple different recipes 306 can be generated, each being associated with a different one of the three or more types of systems. An identification of the type of system to which a particular recipe 306 corresponds can be maintained, such as including an identifier of the type of system in recipe 306 or maintaining a separate list or record of such correspondences. Maintaining an identification of the type of system to which a particular recipe 306 corresponds allows the correct recipe to be identified (e.g., by recipe-based installation module 402 of FIG. 4). System identifiers allow different types of systems to be distinguished from one another, and can be generated in a variety of different manners analogous to the application identifiers discussed above. For example, a system identifier can be a hash value generated by applying a hash function to one or more files of a system, can be a value assigned by a developer or other party, and so forth.

It should further be noted that, in one or more embodiments a system on which an application is installed using new installation package 404 also includes a runtime translator that facilitates running of the application on the system. For example, the application may be configured to access a file stored in a particular location that is actually stored in a different location than the application is expected. By way of another example, the application may be configured to attempt to access an operating system registry in a manner not supported by the system. The runtime translator is able to intercept and convert such requests to the correct format (e.g., accessing the correct location, accessing the operating system registration store in the correct manner, and so forth) for the system.

Figure 5:
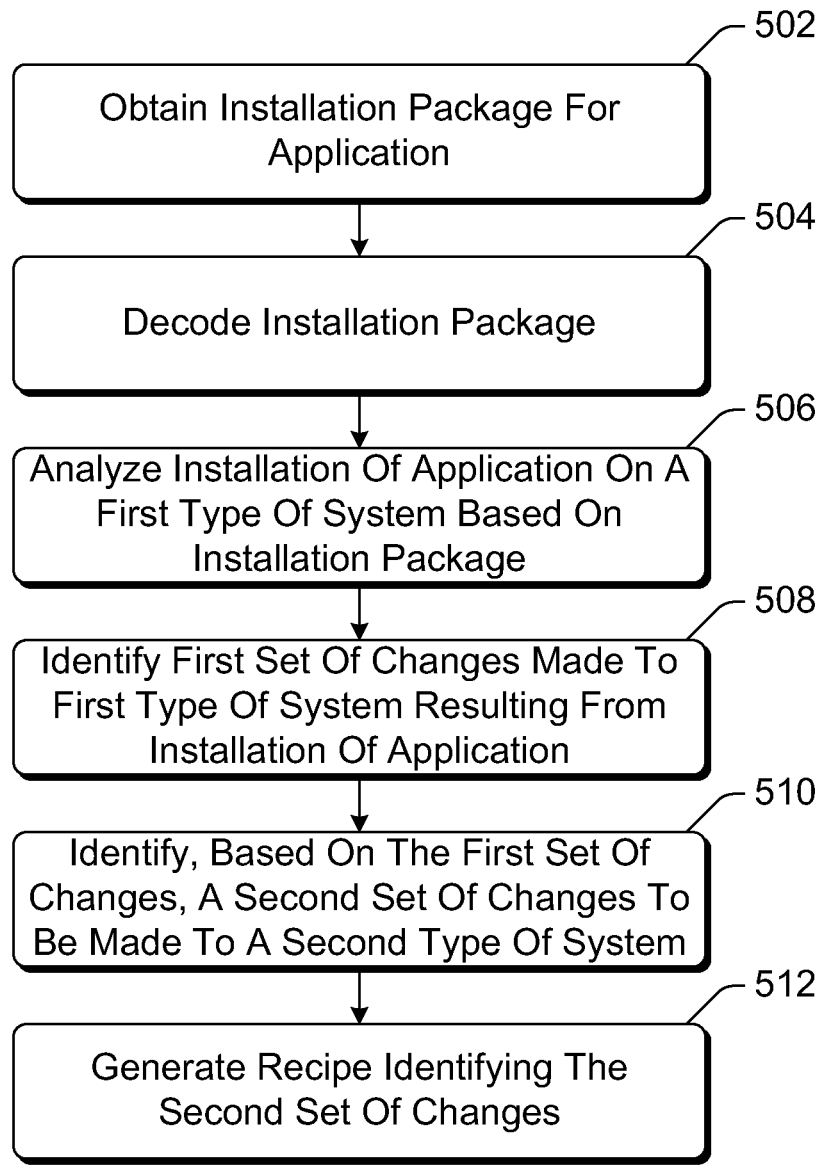
FIG. 5 is a flowchart illustrating an example process for generating a recipe in accordance with one or more embodiments.

FIG. 5 is a flowchart illustrating an example process 500 for generating a recipe in accordance with one or more embodiments. Process 500 is carried out by a system, such as system 104 of FIG. 1, system 202 of FIG. 2, or system 300 of FIG. 3, and can be implemented in software, firmware, hardware, or combinations thereof. Process 500 is an example process for generating a recipe; additional discussions of generating a recipe are included herein with reference to different figures.

In process 500, an installation package for an application is obtained (act 502). The installation package can be obtained in a variety of different manners, such as from a local storage device, from a removable storage device (e.g., an optical disc, a Flash memory device, etc.), from a remote service (e.g., via network 108 of FIG. 1), and so forth.

The obtained installation package is decoded (act 504). As discussed above, installation packages can be combined or compressed in different manners. This combining or compressing is decoded in act 504, allowing the individual files and other data or information included in the installation package to be retrieved.

The installation of the application on a first type of system based on the installation package is analyzed (act 506). As discussed above, this analysis can take a variety of different forms, such as monitoring the installation of the application on the first type of system, accessing a declarative list of actions to be taken to install the application, comparing pre-installation and post-installation states of the first type of system, and so forth.

A first set of changes made to the first type of system resulting from installation of the application on the first type of system is identified (act 508). As discussed above, this first set of changes can include files written to particular locations in the first type of system, data written to an operating system registry of the first type of system, and so forth. It should also be noted that in one or more embodiments this first set of changes resulting from installation of the application on the first type of system can be identified without actually installing the application on the first type of system. For example, the first set of changes can be made by analyzing a declarative list of actions to be taken to install the application without actually installing the application.

Based on the first set of changes identified in act 508, a second set of changes to be made to a second type of system is identified (act 510). As discussed above, based on the changes made to the first type of system and the differences between the first and second types of systems, the second set of changes to be made to the second type of system can be readily identified.

A recipe identifying the second set of changes is generated (act 512). An application id for the application can also be generated and stored as part of the recipe or alternatively associated with the recipe in other manners as discussed above. An identification of a type of system to which the recipe corresponds can also be stored in the recipe or alternatively associated with the recipe in other manners as discussed above. This recipe can optionally be communicated to a recipe store, allowing the generated recipe to be accessed by multiple other devices as discussed above.

Figure 6:
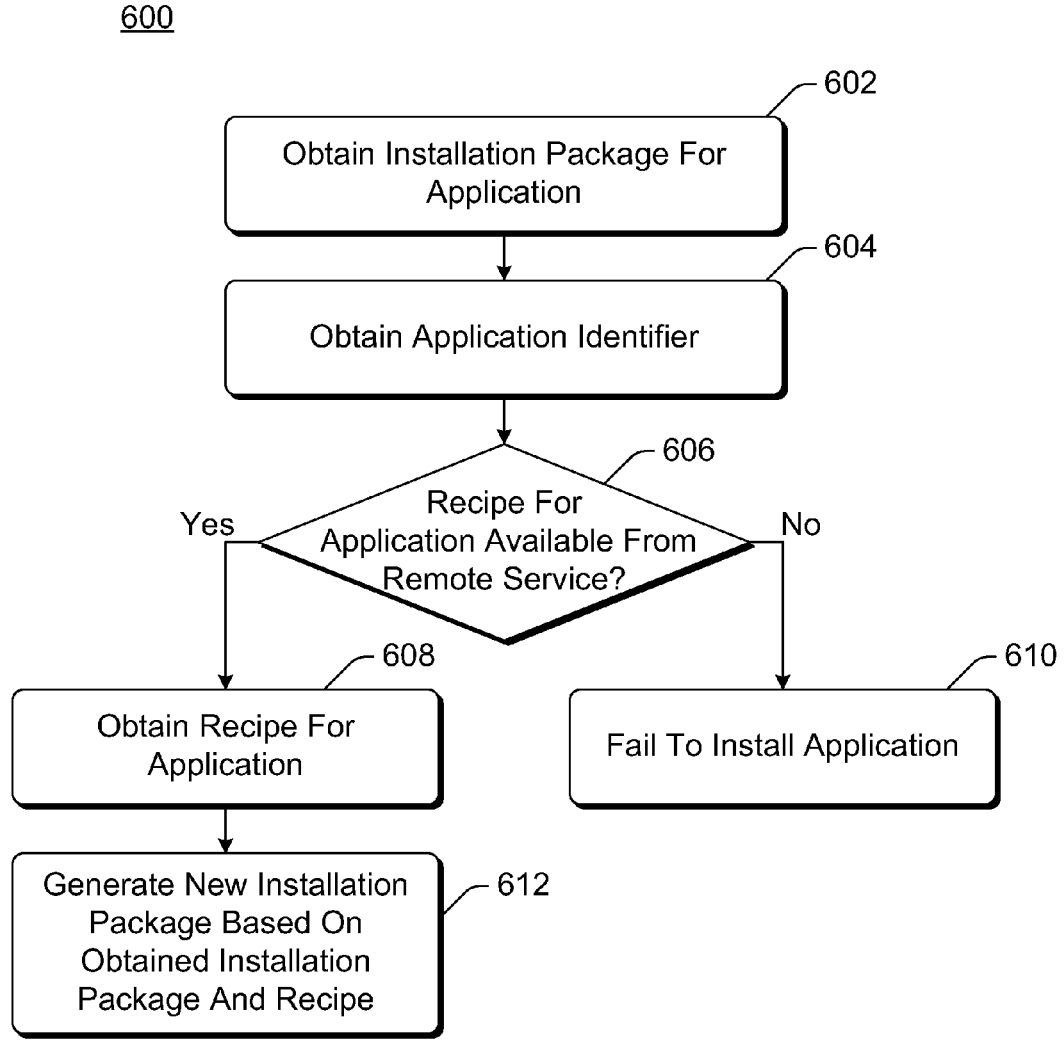
FIG. 6 is a flowchart illustrating an example process for generating a new installation package based at least in part on a recipe in accordance with one or more embodiments.

FIG. 6 is a flowchart illustrating an example process 600 for generating a new installation package based at least in part on a recipe in accordance with one or more embodiments. Process 600 is carried out by a system, such as system 102 of FIG. 1, system 202 of FIG. 2, or system 400 of FIG. 4, and can be implemented in software, firmware, hardware, or combinations thereof. Process 600 is an example process for generating a new installation package based at least in part on a recipe; additional discussions of generating a new installation package based at least in part on a recipe are included herein with reference to different figures.

In process 600, an installation package for an application is obtained (act 602). The installation package can be obtained in a variety of different manners, such as from a local storage device, from a removable storage device (e.g., an optical disc, a Flash memory device, etc.), from a remote service (e.g., via network 108 of FIG. 1), and so forth.

An application identifier for the application is also obtained (act 604). The application identifier can be determined in a variety of different manners as discussed above.

A check is then made as to whether a recipe for the application is available from a remote service (act 606). This remote service can be, for example, recipe service 106 of FIG. 1. This check in act 606 can be performed in different manners, such as by sending the application identifier obtained in act 604 to the remote service. Although described as a remote service in act 606, in addition to (or in place of) checking with the remote service, a local service can also be checked. This local service can be, for example, a recipe store maintained on the device implementing process 600, a recipe store maintained on a removable storage device coupled to the device implementing process 600, and so forth.

If a recipe is available for the application, then the recipe is obtained (act 608). The recipe can be obtained in different manners, such as receiving the recipe from the remote service, accessing another service or location identified by the remote service, and so forth.

A new installation package based on the installation package obtained in act 602 and the recipe obtained in act 608 is then generated (act 612). This new installation package can be used to install the application on the system implementing process 600, or alternatively can be stored or communicated to another system.

Returning to act 606, if the recipe is not available for the application, then installation of the application fails (act 610). Process 600 ends without generating a new installation package.

Alternatively, rather than not installing the application, other actions can be taken. For example, a recipe for the application can be generated (e.g., using process 500 of FIG. 5) and a new installation package based on the installation package obtained in act 602 and the recipe can be generated. By way of another example, installation of the application can proceed using the obtained installation package (and not a recipe) assuming the system implementing process 600 supports installation of applications using the installation package without the recipe. It should also be noted that in this example the system implementing process 600 may not fully support such an installation (e.g., various functionality provided by the system for applications may not be provided to an application installed in accordance with this example).

In the discussion of process 600 above, it is assumed that an application has a single associated recipe. Process 600 can be modified to support embodiments in which multiple recipes can be associated with the same application in order to allow new installation packages to be generated for multiple different types of systems. This modification includes adding an act of obtaining a system identifier (which can be done in a variety of different manners as discussed above), and also modifying act 606 to check whether a recipe for the application and for the type of system is available.

Furthermore, process 600 as well as system 400 of FIG. 4 are discussed primarily with reference to generating a new installation package. Alternatively, rather than generating a new installation package, process 600 (or recipe-based installation module 402) can install the application in addition to (or in place of) generating the new installation package.

Figure 7:
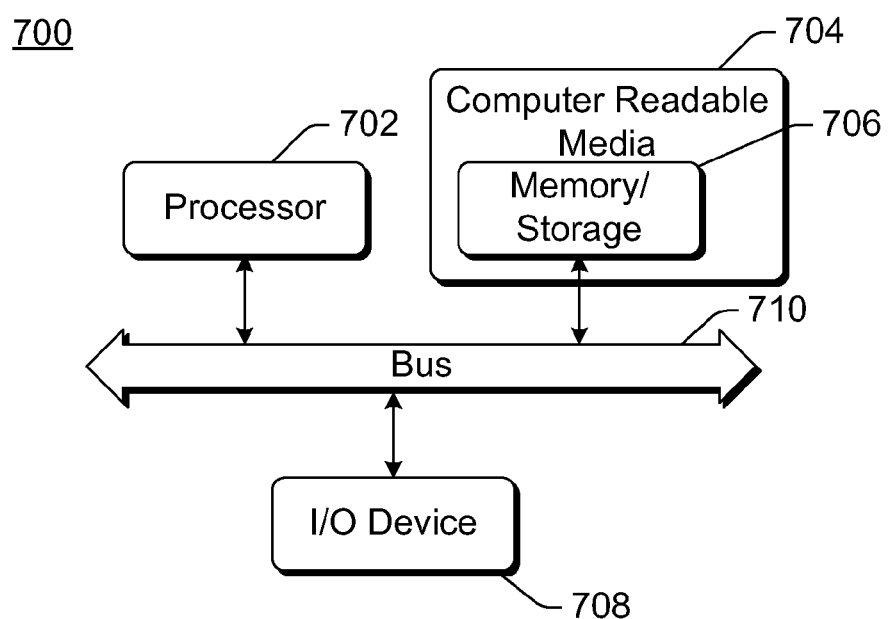
FIG. 7 illustrates an example computing device that can be configured to implement the recipe-based application conversion in accordance with one or more embodiments.

FIG. 7 illustrates an example computing device 700 that can be configured to implement the recipe-based application conversion in accordance with one or more embodiments. Computing device 700 can implement, for example, recipe service 106, system 104, or system 102 of FIG. 1, system 202 of FIG. 2, system 300 of FIG. 3, and/or system 400 of FIG. 4.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term "module" as used herein generally represents software, firmware, hardware, or combinations thereof. In the case of a software implementation, the module represents program code that performs specified tasks when executed on a processor (e.g., CPU or CPUs). The program code can be stored in one or more computer readable memory devices, further description of which may be found with reference to FIG. 7. The features of the recipe-based application conversion techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer readable memories or disks having stored thereon multiple instructions that, when executed by one or more processors of a device, cause the one or more processors to:

obtain an installation package associated with an application;

analyze installation of the application in a first type of system based at least in part on the installation package;

identify a first set of changes made to the first type of system resulting from installation of the application in the first type of system, the first set of changes including a value written to an operating system registry of the first type of system;

identify, based on the first set of changes, a second set of changes that would be made to a second type of system should the application be installed in the second type of system, the second set of changes including the value being added to a registration store of the second type of system based on a registration declaration identifying one or more values that are to be added to the registration store of the second type of system; and generate a recipe identifying the second set of changes.

2. One or more computer readable memories or disks as recited in claim 1, wherein to analyze installation of the application is to monitor changes made to the first type of system during installation of the application in the first type of system.

3. One or more computer readable memories or disks as recited in claim 1, wherein to analyze installation of the application is to obtain a set of declarative instructions from the installation package describing how the application is installed in the first type of system.

4. One or more computer readable memories or disks as recited in claim 1, wherein to analyze installation of the application is to compare a first state of the first type of system prior to installation of the application in the first type of system to a second state of the first type of system after installation of the application in the first type of system.

5. One or more computer readable memories or disks as recited in claim 1, wherein the first set of changes further includes a file written to a particular folder in the first type of system, and the second set of changes further includes the file being written to a different folder in the second type of system.

6. One or more computer readable memories or disks as recited in claim 1, wherein the multiple instructions further cause the one or more processors to communicate the recipe to a recipe service from which one or more other devices can retrieve the recipe, each of the one or more other devices implementing the second type of system.

7. One or more computer readable memories or disks as recited in claim 1, wherein the multiple instructions further cause the one or more processors to obtain an application identifier for the application, and associate the recipe with the application identifier.

8. One or more computer readable memories or disks as recited in claim 7, wherein to associate the recipe with the application identifier is to include the application identifier in the recipe.

9. One or more computer readable memories or disks as recited in claim 7, wherein the multiple instructions further cause the one or more processors to obtain a system identifier of the second system and associate the recipe with the system identifier.

10. One or more computer readable memories or disks as recited in claim 9, wherein to associate the recipe with the system identifier is to include the system identifier in the recipe.

11. One or more computer readable memories or disks as recited in claim 1, wherein the multiple instructions further cause the one or more processors to generate a new installation package associated with the application, the new installation package being configured for installation of the application on the second type of system and the new installation package being based at least in part on both the recipe and the installation package.

12. A method implemented in a first type of system, the method comprising:
obtaining an installation package associated with an application, the installation package being configured for installation of the application on a second type of system;
obtaining a recipe corresponding to the application, the recipe identifying a first set of one or more changes to be made to the first type of system when installing the application on the first type of system, the first set of one or more changes being based on a second set of one or more changes made to the second system resulting from installing the application on the second type of system, the second set of one or more changes including a value that is written to an operating system registry of the second type of system, and the first set of one or more changes including the value being included in an operating system registration store of the first type of system based on a registration declaration identifying one or more values that are to be added to the operating system registration store of the first type of system; and
generating a new installation package associated with the application, the new installation package being configured for installation of the application on the first type of system and the new installation package being based at least in part on both the recipe and the installation package.

13. A method as recited in claim 12, further comprising:
checking whether the recipe is available from a remote service; and
obtaining the recipe from the remote service only if the recipe is available from the remote service, otherwise generating the recipe.

14. A method as recited in claim 12, wherein obtaining the recipe further comprises:
obtaining an identifier of the application; and
retrieving, from a remote service, the recipe associated with the identifier.

15. A method as recited in claim 14, wherein the identifier comprises a hash value generated by applying a hash function to one or more files included in the installation package.

16. A method as recited in claim 14, wherein obtaining the recipe further comprises:
obtaining an identifier of the second type of system; and
retrieving, from the remote service, the recipe associated with both the identifier of the second type of system and the identifier of the application.

17. A method as recited in claim 12, the second set of one or more changes further including a file that is to be stored in a particular folder in the second type of system, and the first set of one or more changes further identifying a different location where the file is to be stored in the first type of system.

18. One or more computer readable memories or disks having stored thereon multiple instructions that, when executed by one or more processors in a first type of system, cause the one or more processors to:
obtain an installation package associated with an application, the installation package being configured for installation of the application on a second type of system;
obtain an identifier of the application;
check, based on the identifier, whether a recipe corresponding to the application is available from a remote service, the recipe identifying a first set of one or more changes to be made to the first type of system when installing the application on the first type of system, the first set of one or more changes being based on a second set of one or more changes made to the second type of system resulting from installing the application on the second type of system, the second set of one or more changes including a value that is written to an operating system registry of the second type of system, and the first set of one or more changes including the value being added to an operating system registration store of the first type of system based on a registration declaration identifying one or more values that are to be added to the operating system registration store of the first type of system;
obtain the recipe from the remote service if the recipe is available from the remote service, otherwise fail to install the application; and
generate a new installation package associated with the application, the new installation package being configured for installation of the application on the first type of system and the new installation package being based at least in part on the recipe and the installation package.

19. One or more computer readable memories or disks as recited in claim 1, the first type of system and the second type of system comprising different versions of an operating system.

20. A method as recited in claim 12, the first type of system and the second type of system comprising different versions of an operating system.

* * * * *